United States Patent
Elshafie et al.

(10) Patent No.: US 12,245,144 B2
(45) Date of Patent: Mar. 4, 2025

(54) PERIODIC REFERENCE SIGNALS IN A POWER SAVING MODE

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 17/644,213

(22) Filed: Dec. 14, 2021

(65) Prior Publication Data
US 2023/0189137 A1    Jun. 15, 2023

(51) Int. Cl.
*H04W 72/02* (2009.01)
*H04W 24/10* (2009.01)
*H04W 52/02* (2009.01)

(52) U.S. Cl.
CPC ....... *H04W 52/0206* (2013.01); *H04W 24/10* (2013.01)

(58) Field of Classification Search
CPC . H04W 52/0206; H04W 72/23; H04W 16/08; H04W 24/10; H04W 4/40; H04W 48/16; H04W 52/0212; H04W 52/0229; H04W 56/001; H04W 72/0446; H04W 72/21; H04W 76/15; H04W 76/27; H04W 76/36
See application file for complete search history.

(56) References Cited

U.S. PATENT DOCUMENTS

| | | | | |
|---|---|---|---|---|
| 11,689,937 | B2* | 6/2023 | Zhou | H04B 7/0617 370/329 |
| 11,831,489 | B2* | 11/2023 | Cirik | H04W 72/21 |
| 2015/0215929 | A1 | 7/2015 | Damnjanovic et al. | |
| 2018/0376422 | A1* | 12/2018 | Shu | H04W 52/0235 |
| 2020/0229082 | A1 | 7/2020 | Jang et al. | |
| 2020/0314664 | A1* | 10/2020 | Zhou | H04L 25/0226 |
| 2023/0309115 | A1* | 9/2023 | Zhou | H04W 72/0457 |
| 2024/0072979 | A1* | 2/2024 | Jeon | H04L 5/0094 |

FOREIGN PATENT DOCUMENTS

WO    WO-2020047080 A1    3/2020

OTHER PUBLICATIONS

International Search Report and Written Opinion—PCT/US2022/080109—ISA/EPO—Mar. 3, 2023.

* cited by examiner

*Primary Examiner* — Phuc H Tran
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive an indication of a power saving mode of the base station for communicating with a base station. The UE may communicate with the base station, with the communicating including transmitting one or more periodic reference signals having a configuration that is based at least in part on the power saving mode of the base station, or receiving the one or more periodic reference signals having the configuration that is based at least in part on the power saving mode of the base station. Numerous other aspects are provided.

30 Claims, 10 Drawing Sheets

PERIODIC REFERENCE SIGNALS IN A POWER SAVING MODE

FIELD OF THE DISCLOSURE

Aspects of the present disclosure generally relate to wireless communication and specifically to techniques and apparatuses for communicating periodic reference signals while in a power saving mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband interne access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some networks, network devices such as base stations may manage wireless communications using an unnecessary amount of power consumption. In some networks, the network devices may have power constraints that limit an amount of power resources available to the network devices to manage the wireless communications. The network devices may support changing communication parameters that are associated with different power consumption rates based at least in part on power constraints or a determination that power consumption can be reduced while managing current wireless communications, among other examples. A base station may indicate, to a UE, values of the communication parameters to apply to a subsequent communication based at least in part on a power consumption rate. However, indicating the values for the communication parameters consumes communication, computing, network, or power resources of the UE or the base station. Additionally or alternatively, dynamic signaling, such as a downlink control information message, may have limited information fields for carrying the values for the communication parameters for the subsequent communication. In this way, the base station may be unable to realize potential power saving that the base station may otherwise support.

SUMMARY

Some aspects described herein relate to a method of wireless communication performed by a user equipment (UE). The method may include receiving an indication of a power saving mode of a base station. The method may include communicating with the base station, the communicating comprising, transmitting one or more periodic reference signals having a configuration that is based at least in part on the power saving mode of the base station, or receiving the one or more periodic reference signals having the configuration that is based at least in part on the power saving mode of the base station.

Some aspects described herein relate to a method of wireless communication performed by a base station. The method may include transmitting an indication of a power saving mode of the base station for communicating with a UE. The method may include communicating with the UE, the communicating comprising, transmitting one or more periodic reference signals having a configuration that is based at least in part on the power saving mode of the base station, or receiving the one or more periodic reference signals having the configuration that is based at least in part on the power saving mode of the base station.

Some aspects described herein relate to a UE for wireless communication. The user equipment may include a memory and one or more processors coupled to the memory. The one or more processors may be configured to receive an indication of a power saving mode of a base station. The one or more processors may be configured to communicate with the base station, the communication comprising transmitting one or more periodic reference signals having a configuration that is based at least in part on the power saving mode of the base station, or receiving the one or more periodic reference signals having the configuration that is based at least in part on the power saving mode of the base station.

Some aspects described herein relate to a base station for wireless communication. The base station may include a memory and one or more processors coupled to the memory. The one or more processors may be configured to transmit an indication of a power saving mode of the base station for communicating with a UE. The one or more processors may be configured to communicate with the UE, comprising transmitting one or more periodic reference signals having a configuration that is based at least in part on the power saving mode of the base station, or receiving the one or more periodic reference signals having the configuration that is based at least in part on the power saving mode of the base station.

Some aspects described herein relate to a non-transitory computer-readable medium that stores a set of instructions for wireless communication by a UE. The set of instructions, when executed by one or more processors of the UE, may cause the UE to receive an indication of a power saving mode of a base station. The set of instructions, when executed by one or more processors of the UE, may cause the UE to communicate with the base station, the communicating comprising.

Some aspects described herein relate to a non-transitory computer-readable medium that stores a set of instructions for wireless communication by a base station. The set of instructions, when executed by one or more processors of the base station, may cause the base station to transmit an indication of a power saving mode of the base station for communicating with a UE. The set of instructions, when executed by one or more processors of the base station, may cause the base station to communicate with the UE, the communicating comprising.

Some aspects described herein relate to an apparatus for wireless communication. The apparatus may include means for receiving an indication of a power saving mode of the base station for communicating with a base station. The apparatus may include means for communicating with the base station, the communicating comprising, means for transmitting one or more periodic reference signals having a configuration that is based at least in part on the power saving mode of the base station, or means for receiving the one or more periodic reference signals having the configuration that is based at least in part on the power saving mode of the base station.

Some aspects described herein relate to an apparatus for wireless communication. The apparatus may include means for transmitting an indication of a power saving mode of the base station for communicating with a UE. The apparatus may include means for communicating with the UE, the communicating comprising, means for transmitting one or more periodic reference signals having a configuration that is based at least in part on the power saving mode of the base station, or means for receiving the one or more periodic reference signals having the configuration that is based at least in part on the power saving mode of the base station.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
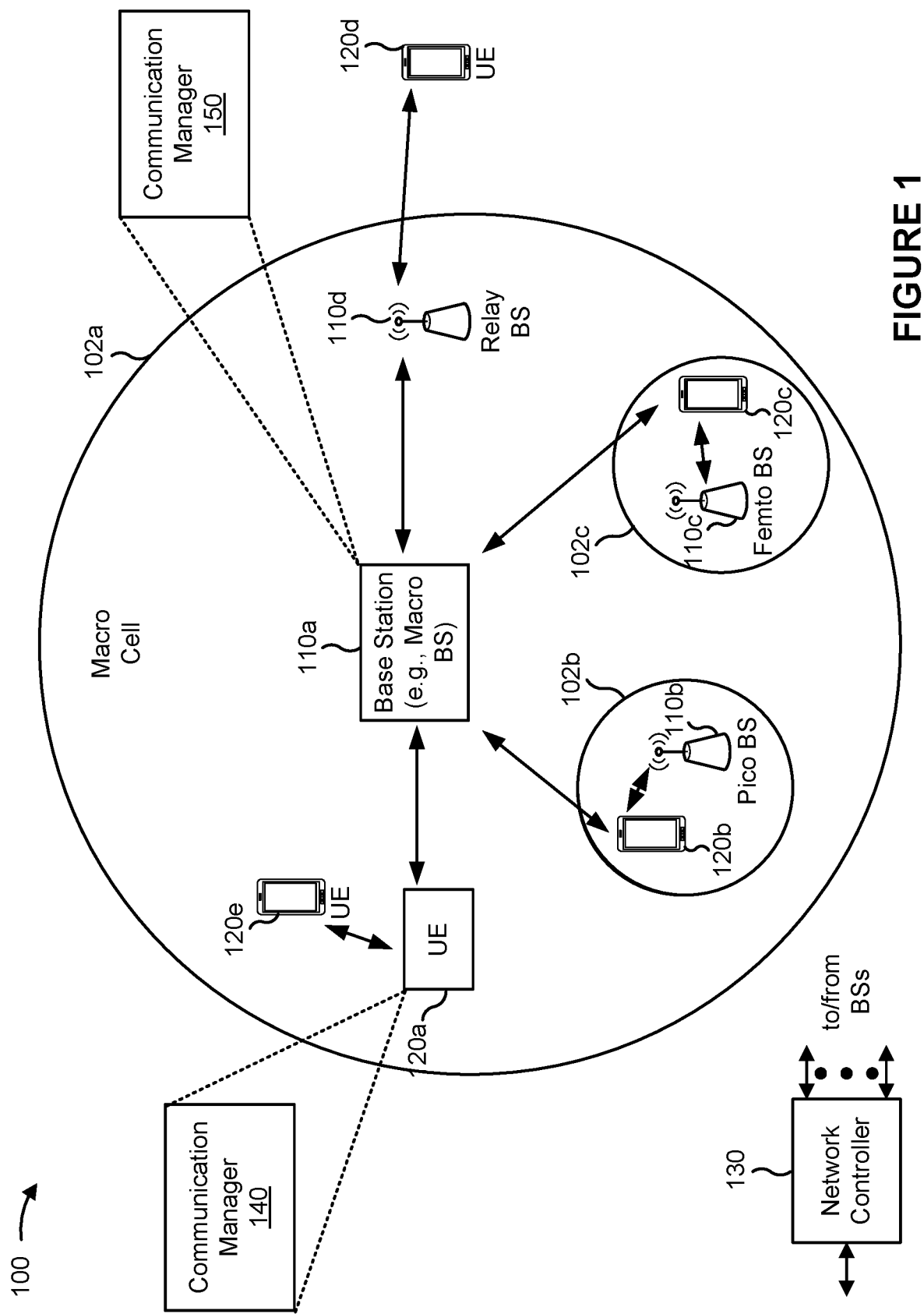
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to communicating periodic reference signals (for example, uplink reference signals or downlink reference signals) while operating in a power saving mode. In some aspects, a base station indicates a power saving mode to a user equipment (UE). For example, the base station may indicate the power saving mode as a selection from a set of candidate power saving modes. The base station and UE may apply a power saving configuration of periodic reference signals based at least in part on the power saving mode of the base station. In some aspects, various power saving configurations of the periodic reference signals are associated with different respective power saving modes of the base station. For example, the periodic reference signals may be associated with a first power saving configuration that is active when a first power saving mode of the base station is active and may be associated with a second power saving configuration that is active when a second power saving mode of the base station is active. The power saving configurations may be associated with, for example, periodicities, repetition numbers, repetition patterns, or time gaps between repetitions of the periodic reference signals, among other examples. In some aspects, the periodic reference signals may include channel state information reference signals (CSI-RSs) or sounding reference signals (SRSs), among other examples.

Particular aspects of the subject matter described in this disclosure can be implemented to realize one or more of the following potential advantages. In some examples, the described techniques can be used by a base station or a UE to conserve power resources associated with communicating periodic reference signals based at least in part on the base station operating in a power saving mode. Additionally or alternatively, the described techniques can be used by a base station or a UE to conserve network communication, power, or computing resources that may have otherwise been used to indicate values of parameters associated with communicating periodic reference signals while operating in the power saving mode.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a power saving mode of a base station; and communicate with the base station, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 140 may perform one or more other operations described herein.

In some aspects, the base station 110 may include a communication manager 150. As described in more detail elsewhere herein, the communication manager 150 may transmit an indication of a power saving mode of the base station for communicating with a UE; and communicate with the UE, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 150 may perform one or more other operations described herein.

In some aspects, the UE 120 may include a communication manager 140. As described in more detail elsewhere herein, the communication manager 140 may receive an indication of a power saving mode of a base station; and communicate with the base station, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 140 may perform one or more other operations described herein.

In some aspects, the base station 110 may include a communication manager 150. As described in more detail elsewhere herein, the communication manager 150 may transmit an indication of a power saving mode of the base station for communicating with a UE; and communicate with the UE, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 150 may perform one or more other operations described herein.

In some aspects, the UE 120 may include a communication manager 140. As described in more detail elsewhere herein, the communication manager 140 may receive an indication of a power saving mode of a base station; and communicate with the base station, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 140 may perform one or more other operations described herein.

In some aspects, the base station 110 may include a communication manager 150. As described in more detail elsewhere herein, the communication manager 150 may transmit an indication of a power saving mode of the base station for communicating with a UE 120; and communicate with the UE 120, the communicating comprising: transmit one or more periodic reference signals having a configuration that is based at least in part on the power saving mode of the base station, or receive the one or more periodic reference signals having the configuration that is based at least in part on the power saving mode of the base station. Additionally or alternatively, the communication manager 150 may perform one or more other operations described herein.

Figure 2:
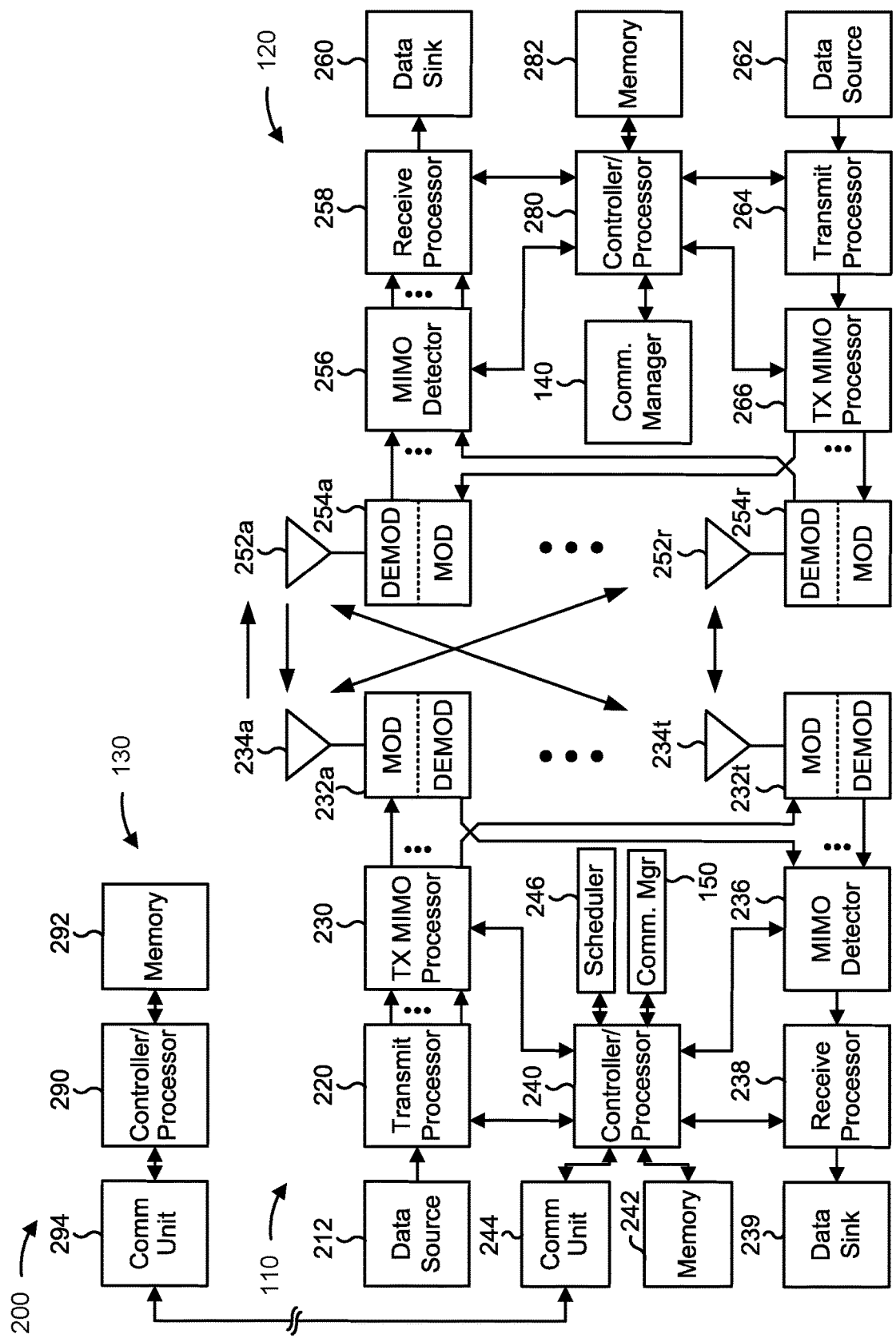
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with communicating periodic reference signals in a power saving mode, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE includes means for receiving an indication of a power saving mode of a base station; or means for communicating with the base station, the communicating comprising: means for transmitting one or more periodic reference signals having a configuration that is based at least in part on the power saving mode of the base station, or means for receiving the one or more periodic reference signals having the configuration that is based at least in part on the power saving mode of the base station. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an indication of a power saving mode of the base station for communicating with a UE; or means for communicating with the UE, the communicating comprising: means for transmitting one or more periodic reference signals having a configuration that is based at least in part on the power saving mode of the base station, or means for receiving the one or more periodic reference signals having the configuration that is based at least in part on the power saving mode of the base station. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
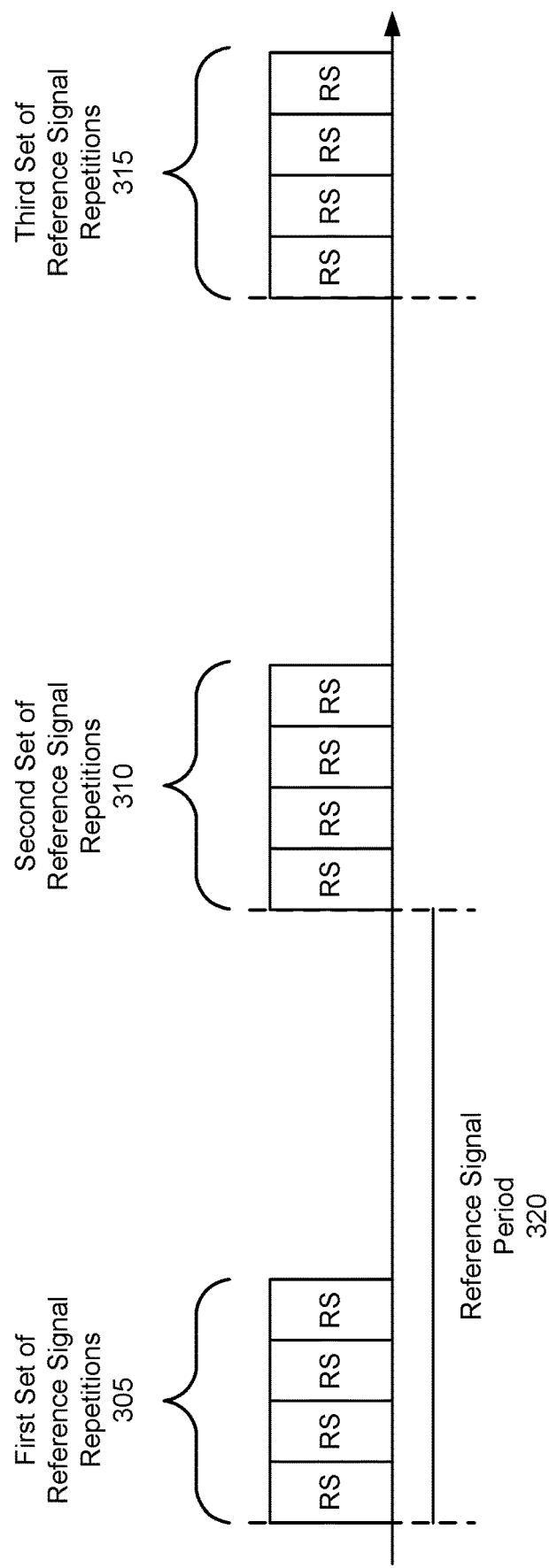
FIG. 3 is a diagram illustrating an example of reference signal repetitions in accordance with the present disclosure.

FIG. 3 is a diagram illustrating an example 300 of reference signal repetitions in accordance with the present disclosure. Reference signals described in connection with FIG. 3 may include CSI-RSs or SRSs, among other examples. The reference signals may include uplink reference signals or downlink reference signals communicated between a base station and a UE. Additionally or alternatively, the reference signals may include sidelink reference signals communicated between UEs.

As shown in example 300, the reference signals include a first set 305 of reference signal repetitions. The first set 305 includes multiple repetitions of a first reference signal transmitted in a pattern that includes resources that are adjacent in time. Similarly, a second set 310 of reference signal repetitions includes repetitions of a second reference signal transmitting in the same pattern that includes resources that are adjacent in time and a third set 315 of reference signal repetitions includes repetitions of a third reference signal transmitting in the same pattern that includes resources that are adjacent in time.

In some networks, each set of reference signal repetitions may be transmitting in a same pattern. The pattern may be configured to provide a level of improved reception and may result in consumption of an amount of power that is proportional to the level of improved reception. For example, the pattern may be configured to include a relatively high number of repetitions to provide a relatively high level of improved reception and cause the base station and the UE to consume a relatively high amount of power to transmit, receive, demodulate, and decode the reference signals. Alternatively, the pattern may be configured to include a relatively low number of repetitions to provide a relatively low level of improved reception and cause the base station and the UE to consume a relatively low amount of power to transmit, receive, demodulate, and decode the reference signals.

As shown in example 300, the sets 305, 310, 315 of reference signal repetitions may be transmitted and received based at least in part on a reference signal period 320 and may have an associated reference signal periodicity. The reference signal period 320 may be configured to improve communications between the UE and the base station based at least in part on supporting channel estimation, mobility tracking, or phase tracking, among other examples. The periodicity may be configured to provide a level of improved communications and may result in consumption of an amount of power that is proportional to the level of improved communications. For example, the periodicity may be configured with a relatively small reference signal period 320 to provide a relatively high level of improved communications and cause the base station and the UE to consume a relatively high amount of power to transmit, receive, demodulate, and decode the reference signals. Alternatively, the periodicity may be configured with a relatively large reference signal period 320 to provide a relatively low level of improved communications and cause the base station and the UE to consume a relatively low amount of power to transmit, receive, demodulate, and decode the reference signals.

In some networks, network devices such as base stations may manage wireless communications using an unnecessary amount of power consumption (for example, based at least in part on an unnecessary level of improved reception or level of improved communications, among other examples). In some networks, the network devices may have power constraints that limit an amount of power resources available to the network devices to manage the wireless communications. The network devices may support changing communication parameters (for example, parameters for periodic reference signals) that are associated with different power consumption rates based at least in part on power constraints or a determination that power consumption can be reduced while managing current wireless communications, among other examples. The base station may indicate, to a UE, values of the communication parameters to apply to a subsequent communication based at least in part on a power consumption rate. However, indicating the values for the communication parameters consumes communication, computing, network, or power resources of the UE or the base station. Additionally or alternatively, dynamic signaling, such as a downlink control information message, may have limited information fields for carrying the values for the subsequent communication parameters. In this way, the base station may be unable to realize potential power saving that the base station may otherwise support.

Various aspects relate generally to communicating periodic reference signals (for example, uplink reference signals or downlink reference signals) in a power saving mode. Some aspects more specifically relate to the base station indicating a power saving mode to a UE and the base station, and UE applying power saving configurations of periodic reference signals based at least in part on the power saving mode of the base station. In some aspects, the periodic reference signals may be associated with different power saving configurations that are associated with different power saving configurations of the base station. For example, the periodic reference signals may be associated with a first configuration that is active when a first power saving mode of the base station is active and may be associated with a second configuration that is active when a second power saving mode of the base station is active. The power saving configurations may be associated with, for example, periodicities, repetition numbers, repetition patterns, or time gaps between repetitions of the one or more periodic reference signals, among other examples. In some aspects, the reference signals may include CSI-RSs or SRSs, among other examples.

Particular aspects of the subject matter described in this disclosure can be implemented to realize one or more of the following potential advantages. In some examples, the described techniques can be used to conserve power resources based at least in part on the base station operating in a power saving mode, and to conserve network communication, power, or computing resources that may have otherwise been used to indicate values of parameters associated with the periodic reference signals.

Figure 4:
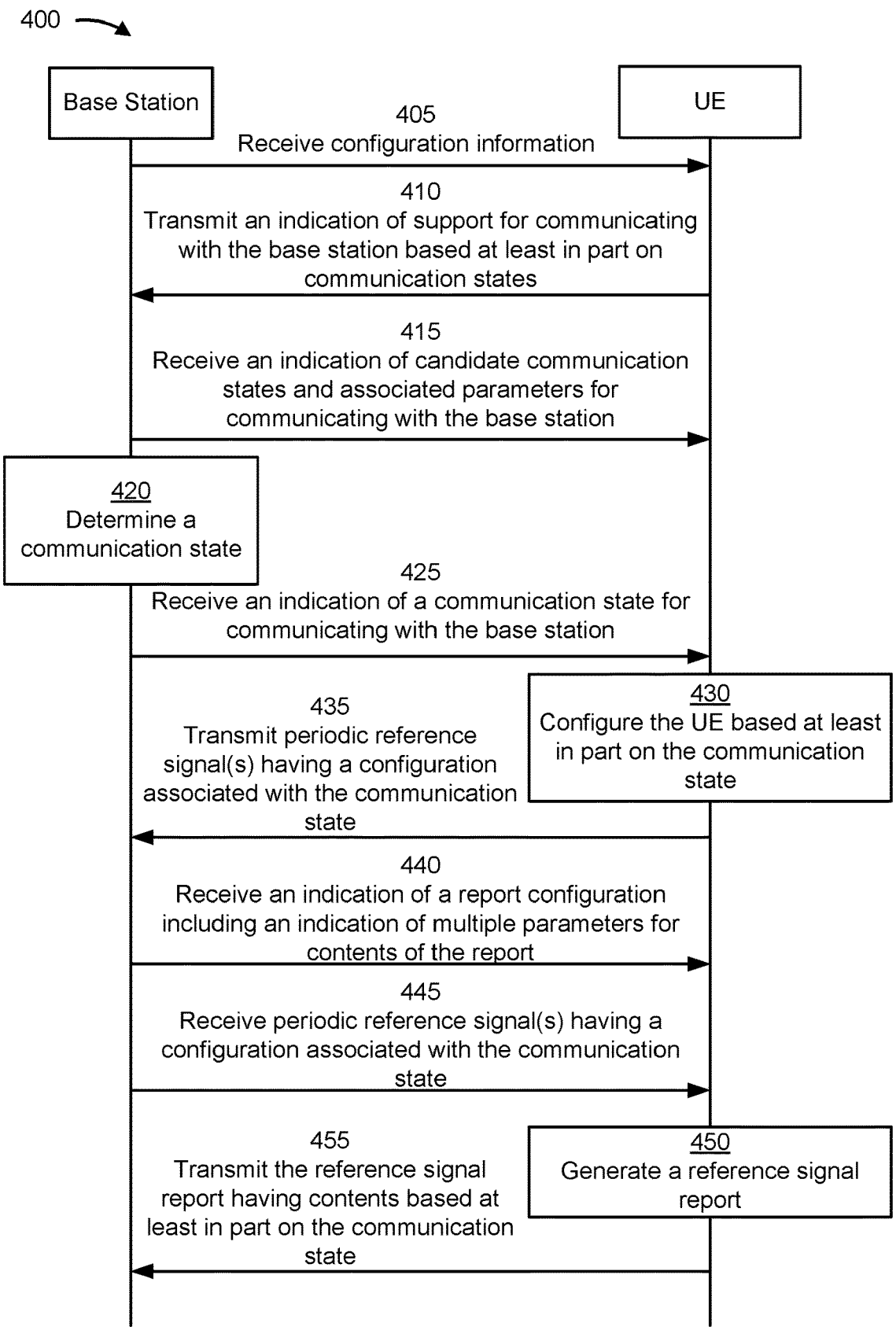
FIGS. 4-6 are diagrams illustrating examples associated with periodic reference signals in a power saving mode in accordance with the present disclosure.

FIG. 4 is a diagram illustrating an example 400 associated with communicating for periodic reference signals in a power saving mode, in accordance with the present disclosure. As shown in FIG. 4, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 4. Although described in the context of communications between a UE and base station, aspects described herein may be applied to communications between other pairs of communication devices, such as a first UE and a second UE, in the scope of this disclosure.

In a first operation 405, the base station may transmit, and the UE may receive, configuration information. In some aspects, the UE may receive the configuration information via one or more of radio resource control (RRC) signaling, one or more medium access control (MAC) control elements (CEs), or downlink control information (DCI), among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to transmit an indication of support for communicating with the base station based at least in part on communication states, such as a power saving mode of the base station. In some aspects, the configuration information may indicate that the base station is to transmit, and the UE is to receive, an indication of a set of candidate communication states and associated parameters for communicating with the base station. For example, the configuration information may indicate that the UE is to apply a configuration for one or more periodic reference signals based at least in part on an active power saving mode as indicated by the base station.

The UE may configure itself based at least in part on the configuration information. In some aspects, the UE may be configured to perform one or more operations described herein based at least in part on the configuration information.

In a second operation 410, the UE may transmit, and the base station may receive, an indication of support for communicating with the base station based at least in part on communication states. In some aspects, the UE may transmit the indication of support before receiving a portion of the configuration information described in connection with the first operation 405. For example, the UE may receive a first portion of the configuration information that indicates that the UE is to transmit the indication of support and may receive a second portion of the configuration information that indicates a configuration for communication with the base station based on the communication states or power saving modes of the base station.

In a third operation 415, the UE may receive, and the base station may transmit, an indication of candidate communication states and associated parameters for communicating with the base station. In some aspects, the indication of the candidate communication states and associated parameters may indicate a mapping of the candidate communication states to one or more parameters associated with communicating the one or more periodic reference signals. For example, the mapping may include an indication of, for each candidate communication state or power saving mode, a periodicity, a repetition number, a repetition pattern, or a time gap (for example, in units of symbols, sub-slots, or slots, among other examples) between repetitions of the one or more periodic reference signals. The one or more parameters may include a first set of parameters for communicating a first type of reference signals (for example, CSI-RSs) and a second set of parameters for communicating a second type of reference signals (for example, SRSs). Additionally or alternatively, the one or more parameters may include a single set of parameters for communicating multiple types of reference signals.

In a fourth operation 420, the base station may determine a communication state to use for communicating with the UE or additional UEs served in a cell provided by the base station. For example, the base station may determine to use a communication state associated with a power saving mode of the base station. The base station may determine to apply the power saving mode of the base station based at least in part on power constraints that limit an amount of power resources available to the base station to manage the wireless communications or a determination that power consumption can be reduced while managing current wireless communications, among other examples. In some aspects, the base station may determine the power saving mode based at least in part on a number of UEs connected with the base station, an amount of traffic handled by the base station, a type of traffic handled by the base station, channel conditions for channels between the base station and the UE, or communication channels for UEs connected with the base station, among other examples.

In a fifth operation 425, the UE may receive, and the base station may transmit, an indication of a communication state for communicating with the base station. In some aspects, the indication of the communication state may include an indication of a power saving mode of the base station. In some aspects, the indication of the communication state may indicate an active communication state from a set of candidate communication states (for example, as described in connection with the third operation 415). In some aspects, the UE may receive the indication of the power saving mode via an explicit indication or via an indication of a change of the power saving mode relative to another power saving mode of the base station (for example, an indication to reduce or increase power from the other power saving mode).

In some aspects, the indication of the communication state may include an update from an additional communication state that was previously active. In some aspects, the communication state or the additional communication state may be associated with cancelation of one or more occasions of the one or more periodic reference signals that were not canceled in the power saving mode or a sampling factor of the one or more periodic reference signals that is different from a sampling factor associated with the power saving mode. For example, a periodic reference signal (for example, periodic CSI-RS or periodic SRS) may be canceled for a first set of candidate communication states or power saving modes or may be canceled based at least in part on a change from a first candidate communication state to a second communication state. In some aspects, the canceled periodic reference signal may be activated based at least in part on an indication (for example, an explicit indication) of activation by the base station or based at least in part on changing to another candidate communication state to implicitly activate the canceled periodic reference signal. In some aspects, the sampling factor may be relative to a full power mode, to a power mode where power saving is not a primary basis for selecting communication parameters, or to a current, or previously active, power saving mode.

In some aspects, a sampling or upsampling factor (for example, based at least in part on a periodicity of the periodic reference signals) may be signaled. In some aspects, a periodic reference signal may be effectively canceled based at least in part on applying a sufficiently large upsampling factor. The sampling or upsampling factor may be indicated based at least in part on the communication state or power saving mode of the base station or by explicit signaling of the sampling, upsampling, or subsampling factors using layer 1 or layer 2 signaling.

In some aspects, the communication state or the power saving mode may be associated with a comb level of the one or more periodic reference signals. In some aspects, the communication state or the power saving mode may be associated with a comb offset of the one or more periodic reference signals. For example, the comb level or the comb offset may be associated with the configuration that is based at least in part on the power saving mode of the base station.

In some aspects, the base station may transmit (for example, in a separate message) an indication to associate, with the power saving mode of the base station, a periodicity, a repetition number, a repetition pattern, or a time gap between repetitions of the one or more periodic reference signals, among other examples. For example, the base station may transmit the indication of the power saving mode and may also (for example, in a separate message) transmit an indication of parameters of the one or more reference signals that are to change based at least in part on the indication of the power saving mode. In some aspects, the base station may transmit the indication of the parameters via layer 1 or layer 2 signaling, such as DCI or MAC CEs.

In some aspects, the configuration of the one or more periodic reference signals is associated with cancelation of a set of the one or more periodic reference signals. The cancelation may be based at least in part on one or more ports associated with the one or more periodic reference signals. For example, the configuration may indicate to cancel all periodic reference signal resources (and any corresponding report) for all resources with a number of ports that satisfies a threshold number, where the threshold number is based at least in part on the power saving mode or communication state.

In a sixth operation 430, the UE may configure the UE based at least in part on the communication state. In some aspects, the UE may configure the UE further based at least in part on additional signaling from the base station. For example, the base station may transmit, in addition to the indication of the communication state, an indication of a periodicity of the one or more periodic reference signals, a repetition number of the one or more periodic reference signals, a repetition pattern of the one or more periodic reference signals, or a time gap between repetitions of the one or more periodic reference signals, among other examples.

In a seventh operation 435, the UE may transmit, and the base station may receive, one or more periodic reference signals having a configuration associated with the communication state. For example, the UE may transmit the one or more periodic reference signals having the configuration that is based at least in part on the power saving mode of the base station. The one or more periodic reference signals may include one or more SRSs, among other examples.

The configuration associated with the communication state may be associated with a periodicity of the one or more periodic reference signals, a repetition number of the one or more periodic reference signals, a repetition pattern of the one or more periodic reference signals, or a time gap between repetitions of the one or more periodic reference signals, among other examples.

In some aspects, the UE may transmit the one or more periodic reference signals based at least in part receiving an indication to change to the power saving mode of the base station (for example, to change from a power saving mode in which the one or more periodic reference signals are canceled or have a sufficiently large upsampling number), receiving an indication to activate the one or more periodic reference signals, or receiving an indication to change the sampling factor of the one or more periodic reference signals to a sampling factor that is different from a sampling factor associated with the power saving mode, among other examples.

In an eighth operation 440, the UE may receive, and the base station may transmit, an indication of a report configuration including an indication of multiple parameters for contents of the report. In some aspects, the report configuration may indicate a set of one or more candidate values of a timing offset between a symbol allocated for receiving the one or more periodic reference signals and a first uplink transmission symbol scheduled for transmitting a CSI-RS report associated with the one or more periodic reference signals. In some aspects, the configuration of the one or more periodic reference signals may be associated with (for example, may map to) the set of one or more candidate values of the timing offset between the symbol allocated for receiving the one or more periodic reference signals and the first uplink transmission symbol scheduled for transmitting the CSI-RS report associated with the one or more periodic reference signals.

In some aspects, the report configuration may indicate different report content to be included with the report based at least in part on the communication state or power saving mode. In some aspects, the report configuration may indicate candidate sets of report elements, the candidate sets of report elements selectable for inclusion in the report based at least in part on the power saving mode of the base station. For example, based at least in part on the base station being in a power saving mode configured to reduce power consumption, an amount of content or a payload size of the report may be reduced. Alternatively, based at least in part on the base station being in a power saving mode configured to improve communication at the expense of increased power consumption, an amount of content or a payload size of the report may be increased.

In a ninth operation 445, the UE may receive, and the base station may transmit, the one or more periodic reference signals having a configuration associated with the communication state. For example, the UE may receive the one or more periodic reference signals having the configuration that is based at least in part on the power saving mode of the base station. The one or more periodic reference signals may include one or more CSI-RSs, among other examples.

The configuration associated with the communication state may be associated with a periodicity of the one or more periodic reference signals, a repetition number of the one or more periodic reference signals, a repetition pattern of the one or more periodic reference signals, or a time gap between repetitions of the one or more periodic reference signals, among other examples.

In a tenth operation 450, the UE may generate a reference signal report. In some aspects, the UE may include report elements based at least in part on the communication state or the power saving mode of the base station. For example, the UE may include report elements based at least in part on the report elements being mapped to the communication state or power saving mode, as indicated in the report configuration described in connection with the eighth operation 440.

In some aspects, the report (for example, a CSI report) may be configured based at least in part on the power saving mode. In this way, a number of polar decoder cycles (a number of decoding iterations) may be reduced based at least in part on reducing payload sizes. The UE may transmit, based at least in part on the power saving mode or communication state, a compressed report that includes, for example, reduced contents based at least in part on dropping indications associated with subbands, channel quality index, or precoding matrix indicators, among other examples. In some aspects, the base station may indicate a configuration for each candidate power saving mode or communication state (for example, in a first communication), and the UE may select the configuration for a set of periodic reference signals based at least in part on an active power saving mode or communication state.

In an eleventh operation 455, the UE may transmit the reference signal report having contents based at least in part on the communication state.

Figure 5:
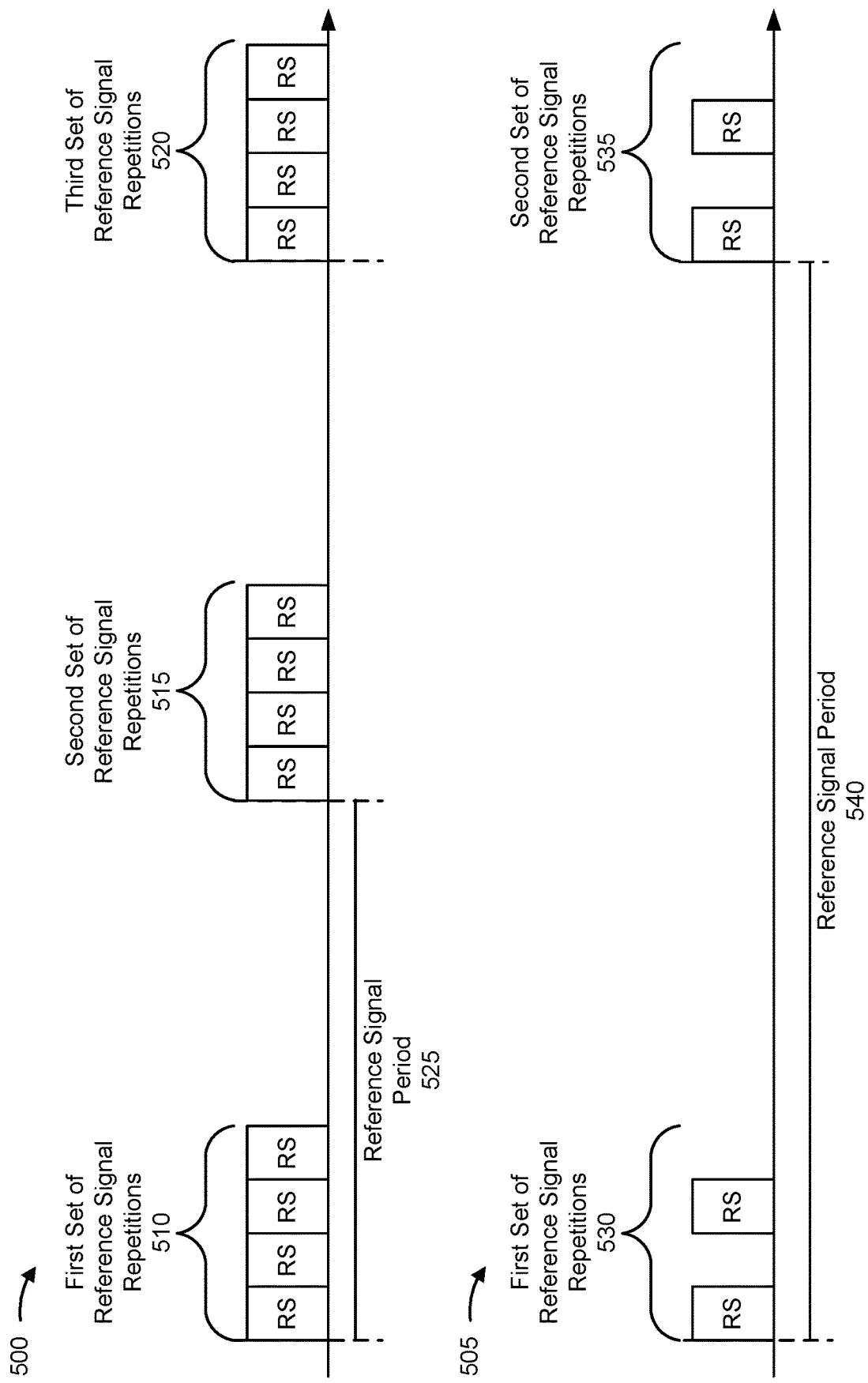

FIG. 5 is a diagram illustrating an example 500 associated with communicating periodic reference signals in a power saving mode, in accordance with the present disclosure. In example 500, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 5. Although described in the context of communications between a UE and base station, aspects described herein may be applied to communications between other pairs of communication devices, such as a first UE and a second UE, in the scope of this disclosure.

FIG. 5 illustrates a first example 500 of reference signal repetitions and a first reference signal period. FIG. 5 also illustrates a second example 505 of reference signal repetitions and a second reference signal period. Reference signals described in connection with FIG. 5 may include CSI-RSs or SRSs, among other examples. The reference signals may include uplink reference signals or downlink reference signals communicated between a base station and a UE. Additionally or alternatively, the reference signals may include sidelink reference signals communicated between UEs.

As shown in example 500, a first set 510 of reference signal repetitions may include four reference signal repetitions in a pattern that includes resources that are adjacent in time. Similarly, a second set 515 and a third set 520 of reference signal repetitions may also include four reference signal repetitions in a pattern that includes resources that are adjacent in time. In some aspects, each set of reference signal repetitions may be transmitting in a same pattern based at least in part on signaling from a base station that the reference signals are communicated while the base station is in a first power saving mode or communication state. The pattern may be configured to provide a level of improved reception and may result in consumption of an amount of power that is proportional to the level of improved reception. For example, the pattern may be configured to include a relatively high number of repetitions to provide a relatively high level of improved reception and cause the base station and the UE to consume a relatively high amount of power to transmit, receive, demodulate, and decode the reference signals.

As shown in example 500, the sets 510, 515, 520 of reference signal repetitions may be transmitted and received based at least in part on a reference signal period 525 and may have an associated reference signal periodicity. The reference signal period 525 may be configured to improve communications between the UE and the base station based at least in part on supporting channel estimation, mobility tracking, or phase tracking, among other examples. The periodicity may be configured to provide a level of improved communications and may result in consumption of an amount of power that is proportional to the level of improved communications. For example, the periodicity may be configured with a relatively small reference signal period 525 to provide a relatively high level of improved communications and cause the base station and the UE to consume a relatively high amount of power to transmit, receive, demodulate, and decode the reference signals.

As shown in example 505, a first set 530 of reference signal repetitions may include two reference signal repetitions in a pattern that includes resources that are spaced by a gap in time. Similarly, a second set 535 of reference signal repetitions may also include two reference signal repetitions in a pattern that includes resources that are spaced by a gap in time. In some aspects, each set of reference signal repetitions may be transmitting in a same pattern based at least in part on signaling from a base station that the reference signals are communicated while the base station is in a second power saving mode or communication state. The pattern may be configured to include a relatively low number of repetitions to provide a relatively low level of improved reception and cause the base station and the UE to consume a relatively low amount of power to transmit, receive, demodulate, and decode the reference signals.

As shown in example 505, the sets 530, 535 of reference signal repetitions may be transmitted and received based at least in part on a reference signal period 540 and may have an associated reference signal periodicity. The reference signal period 540 may be configured to improve communications between the UE and the base station based at least in part on supporting channel estimation, mobility tracking, or phase tracking, among other examples. The periodicity may be configured with a relatively large reference signal period 540 to provide a relatively low level of improved communications and cause the base station and the UE to consume a relatively low amount of power to transmit, receive, demodulate, and decode the reference signals.

Figure 6:
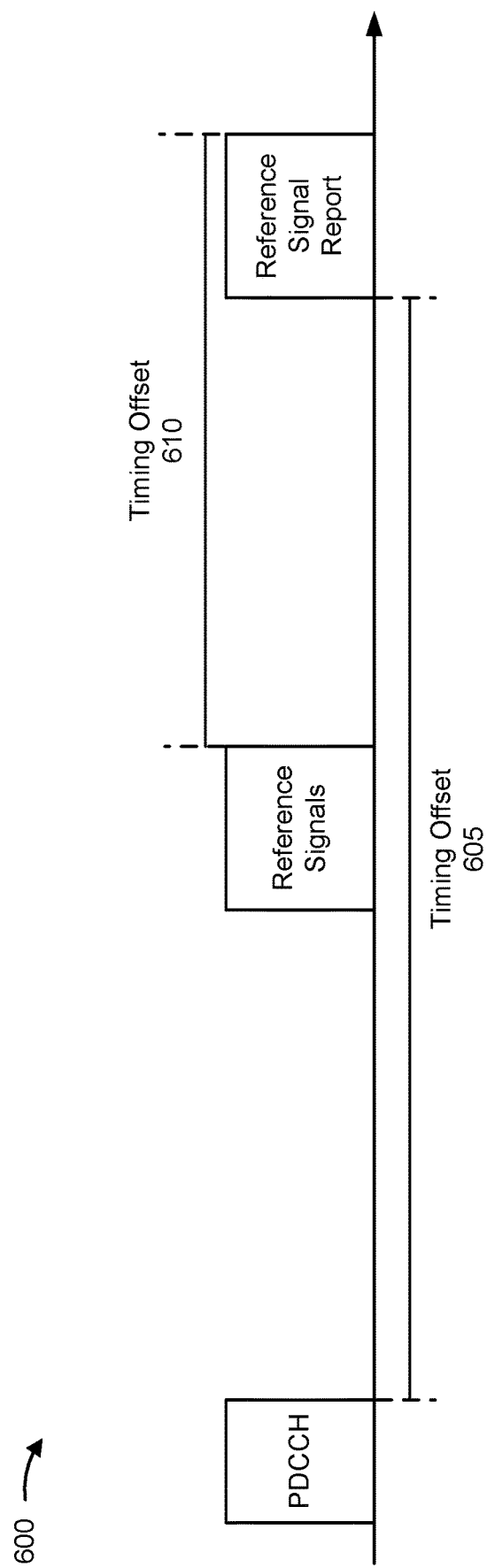

FIG. 6 is a diagram illustrating an example 600 associated with communicating periodic reference signals in a power saving mode, in accordance with the present disclosure. In example 600, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 6. Although described in the context of communications between a UE and base station, aspects described herein may be applied to communications between other pairs of communication devices, such as a first UE and a second UE, in the scope of this disclosure.

As shown in example 600, a base station may transmit a physical downlink control channel (PDCCH) communication to a UE that schedules reference signals and a reference signal report. The PDCCH communication may indicate a timing offset 605 between a last PDCCH symbol and a first symbol allocated to the reference signal report (for example, a physical uplink shared channel (PUSCH) with CSI feedback). The PDCCH communication may also indicate a timing offset 610 between a last symbol allocated to communication of the reference signals (for example, CSI-reference signals) and the first symbol allocated to the reference signal report.

In some aspects, a set of candidate timing offsets for selection as the timing offset 605 may be based at least in part on a communication state or power saving mode of the base station. For example, minimum values for the set of the candidate timing offsets may be based at least in part on the communication state or power saving mode. In this way, the timing offset 605 may be a minimum value that corresponds to the power saving mode of the base station and a capability, when in the power saving mode, to process the reference signal report.

In some aspects, a set of candidate timing offsets for selection as the timing offset 610 may be based at least in part on a communication state or power saving mode of the base station. For example, minimum values for the set of the candidate timing offsets may be based at least in part on the communication state or power saving mode. In this way, the timing offset 610 may be a minimum value that corresponds to the power saving mode of the base station and a capability, when in the power saving mode, to process the reference signal report after transmitting the reference signals.

Figure 7:
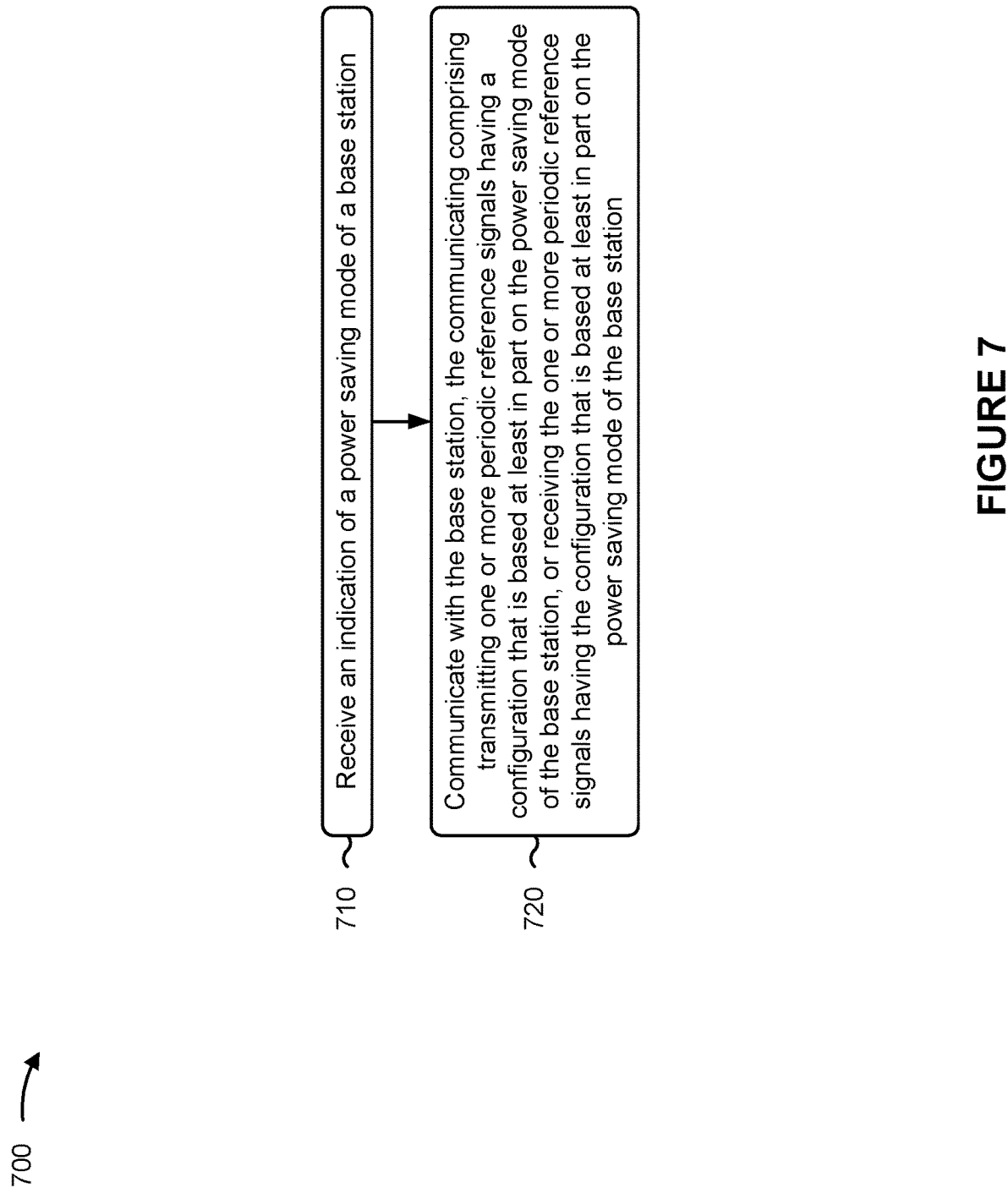
FIG. 7 is a flowchart illustrating an example process performed, for example, by a UE in accordance with the present disclosure.

FIG. 7 is a flowchart illustrating an example process 700 performed, for example, by a UE in accordance with the present disclosure. Example process 700 is an example where the UE (for example, UE 120) performs operations associated with periodic reference signals in a power saving mode.

As shown in FIG. 7, in some aspects, process 700 may include receiving an indication of a power saving mode of a base station (block 710). For example, the UE (such as by using communication manager 140 or reception component 902, depicted in FIG. 9) may receive an indication of a power saving mode of a base station, as described above.

As further shown in FIG. 7, in some aspects, process 700 may include communicating with the base station, the communicating comprising: transmitting one or more periodic reference signals having a configuration that is based at least in part on the power saving mode of the base station, or receiving the one or more periodic reference signals having the configuration that is based at least in part on the power saving mode of the base station (block 720). For example, the UE (such as by using communication manager 140, reception component 902, or transmission component 904 depicted in FIG. 9) may communicate with the base station, the communicating comprising: transmitting one or more periodic reference signals having a configuration that is based at least in part on the power saving mode of the base station, or receiving the one or more periodic reference signals having the configuration that is based at least in part on the power saving mode of the base station, as described above.

Process 700 may include additional aspects, such as any single aspect or any combination of aspects described below or in connection with one or more other processes described elsewhere herein.

In a first additional aspect, the one or more periodic reference signals comprise one or more of CSI-RSs or SRSs.

In a second additional aspect, alone or in combination with the first aspect, the configuration is associated with one or more of a periodicity of the one or more periodic reference signals, a repetition number of the one or more periodic reference signals, a repetition pattern of the one or more periodic reference signals, or a time gap between repetitions of the one or more periodic reference signals.

In a third additional aspect, alone or in combination with one or more of the first and second aspects, process 700 includes receiving an indication of an additional power saving mode of the base station (for example, where the power saving mode is a first power saving mode and the additional power saving mode is a second power saving mode) having an additional configuration (for example, where the configuration is a first configuration and the additional configuration is a second configuration) associated with one or more of cancelation of one or more occasions of the one or more periodic reference signals that were not canceled in the power saving mode, or a sampling factor of the one or more periodic reference signals that is different from a sampling factor associated with the power saving mode.

In a fourth additional aspect, alone or in combination with one or more of the first through third aspects, transmitting the one or more periodic reference signals or receiving the one or more periodic reference signals is based at least in part on one or more of receiving an indication to change to the power saving mode of the base station from a previously active power saving mode of the base station, receiving an indication to activate the one or more periodic reference signals, or receiving an indication to change the sampling factor of the one or more periodic reference signals to a sampling factor that is different from a sampling factor associated with the power saving mode.

In a fifth additional aspect, alone or in combination with one or more of the first through fourth aspects, receiving the indication of the power saving mode of the base station comprises receiving one or both of an explicit indication, or an indication of a change of the power saving mode of the base station relative to another power saving mode of the base station. For example, the indication of the change of the power saving mode of the base station relative to another power saving mode of the base station may indicate to increase power saving or to decrease power consumption relative to a previously, or currently, active power saving mode.

In a sixth additional aspect, alone or in combination with one or more of the first through fifth aspects, the configuration is associated with a comb level of the one or more periodic reference signals that is based at least in part on the power saving mode of the base station, or the configuration is associated with a comb offset of the one or more periodic reference signals that is based at least in part on the power saving mode of the base station.

In a seventh additional aspect, alone or in combination with one or more of the first through sixth aspects, process 700 includes receiving an indication to associate, with the power saving mode of the base station, one or more of a periodicity of the one or more periodic reference signals, a repetition number of the one or more periodic reference signals, a repetition pattern of the one or more periodic reference signals, or a time gap between repetitions of the one or more periodic reference signals.

In an eighth additional aspect, alone or in combination with one or more of the first through seventh aspects, the power saving mode of the base station is based at least in part on one or more of a number of UEs connected with the base station, an amount of traffic handled by the base station, a type of traffic handled by the base station, channeling conditions for channels between the base station and the UE, or communication channels for UEs connected with the base station.

In a ninth additional aspect, alone or in combination with one or more of the first through eighth aspects, the configuration is associated with cancelation of a set of the one or more periodic reference signals, the cancelation being based at least in part on one or more ports associated with the one or more periodic reference signals.

In a tenth additional aspect, alone or in combination with one or more of the first through ninth aspects, the configuration is associated with a set of one or more candidate values of a timing offset between a symbol allocated for receiving the one or more periodic reference signals and a first uplink transmission symbol scheduled for transmitting a CSI-RS report associated with the one or more periodic reference signals.

In an eleventh additional aspect, alone or in combination with one or more of the first through tenth aspects, process 700 includes transmitting a report associated with receiving the one or more periodic reference signals, wherein report elements included in the report are based at least in part on the power saving mode of the base station.

In a twelfth additional aspect, alone or in combination with one or more of the first through eleventh aspects, process 700 includes receiving an indication of a report configuration that indicates candidate sets of report elements, the candidate sets of report elements selectable for inclusion in the report based at least in part on the power saving mode of the base station.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
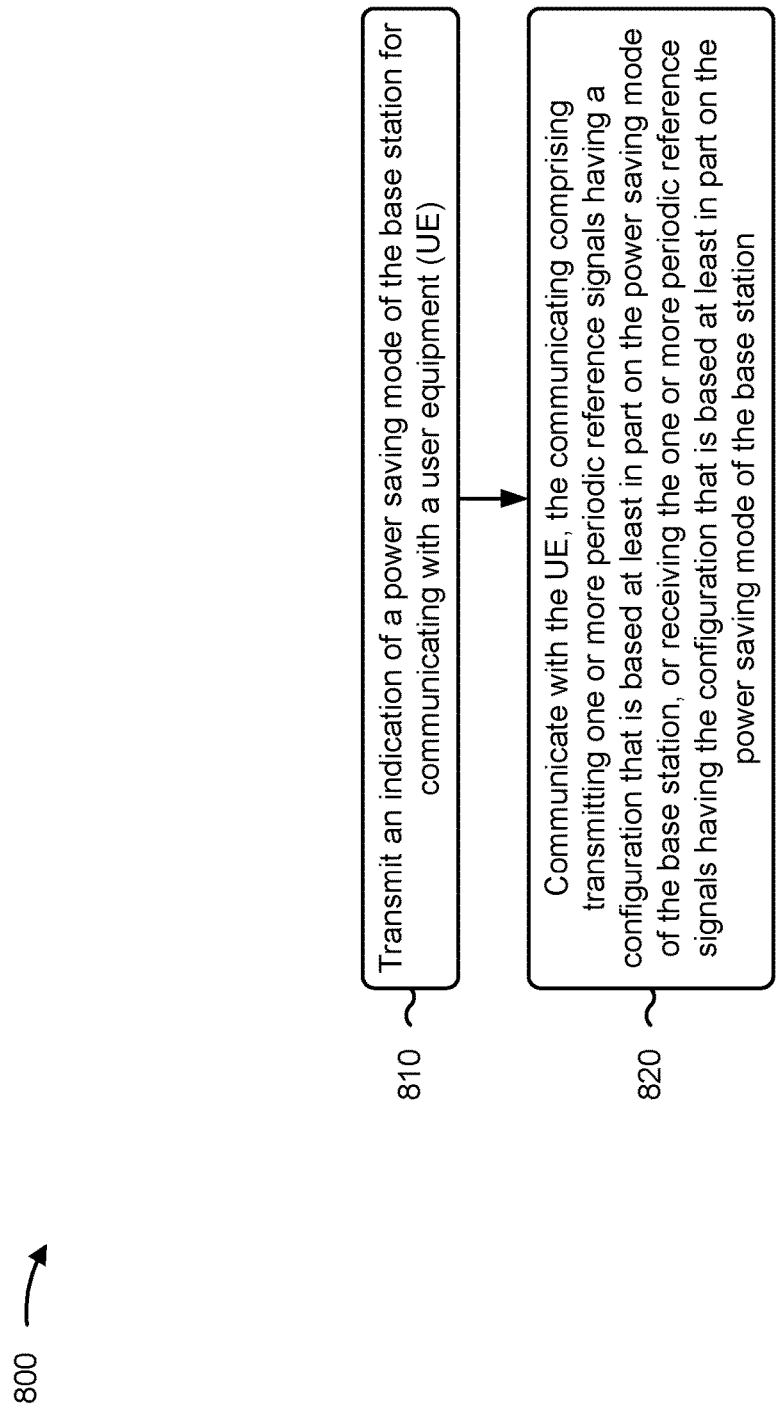
FIG. 8 is a flowchart illustrating an example process performed, for example, by a base station in accordance with the present disclosure.

FIG. 8 is a flowchart illustrating an example process 800 performed, for example, by a base station in accordance with the present disclosure. Example process 800 is an example where the base station (for example, base station 110) performs operations associated with periodic reference signals in a power saving mode.

As shown in FIG. 8, in some aspects, process 800 may include transmitting an indication of a power saving mode of the base station for communicating with a UE (block 810). For example, the base station (such as by using communication manager 150 or transmission component 904, depicted in FIG. 9) may transmit an indication of a power saving mode of the base station for communicating with a UE, as described above.

As further shown in FIG. 8, in some aspects, process 800 may include communicating with the UE, the communicating comprising: transmitting one or more periodic reference signals having a configuration that is based at least in part on the power saving mode of the base station, or receiving the one or more periodic reference signals having the configuration that is based at least in part on the power saving mode of the base station (block 820). For example, the base station (such as by using communication manager 150, reception component 1002, or transmission component 1004, depicted in FIG. 10) may communicate with the UE, the communicating comprising: transmitting one or more periodic reference signals having a configuration that is based at least in part on the power saving mode of the base station, or receiving the one or more periodic reference signals having the configuration that is based at least in part on the power saving mode of the base station, as described above.

Process 800 may include additional aspects, such as any single aspect or any combination of aspects described below or in connection with one or more other processes described elsewhere herein.

In a first additional aspect, the one or more periodic reference signals comprise one or more of CSI-RSs or SRSs.

In a second additional aspect, alone or in combination with the first aspect, the configuration is associated with one or more of a periodicity of the one or more periodic reference signals, a repetition number of the one or more periodic reference signals, a repetition pattern of the one or more periodic reference signals, or a time gap between resources for repetitions of the one or more periodic reference signals.

In a third additional aspect, alone or in combination with one or more of the first and second aspects, process 800 includes transmitting an indication of an additional power saving mode of the base station (for example, where the power saving mode is a first power saving mode and the additional power saving mode is a second power saving mode) having an additional configuration (for example, where the configuration is a first configuration and the additional configuration is a second configuration) associated with one or more of cancelation of one or more occasions of the one or more periodic reference signals that were not canceled in the power saving mode, or a sampling factor of the one or more periodic reference signals that is different from a sampling factor associated with the power saving mode.

In a fourth additional aspect, alone or in combination with one or more of the first through third aspects, transmitting the one or more periodic reference signals or receiving the one or more periodic reference signals is based at least in part on one or more of transmitting an indication to change to the power saving mode of the base station from a previously active power saving mode of the base station, transmitting an indication to activate the one or more periodic reference signals, or transmitting an indication to change the sampling factor of the one or more periodic reference signals to a sampling factor that is different from a sampling factor associated with the power saving mode.

In a fifth additional aspect, alone or in combination with one or more of the first through fourth aspects, transmitting the indication of the power saving mode of the base station comprises transmitting one or both of an explicit indication, or an indication of a change of the power saving mode of the base station relative to another power saving mode of the base station.

In a sixth additional aspect, alone or in combination with one or more of the first through fifth aspects, the configuration is associated with a comb level of the one or more periodic reference signals that is based at least in part on the power saving mode of the base station, or the configuration is associated with a comb offset of the one or more periodic reference signals that is based at least in part on the power saving mode of the base station.

In a seventh additional aspect, alone or in combination with one or more of the first through sixth aspects, process 800 includes transmitting an indication to associate, with the power saving mode of the base station, one or more of a periodicity of the one or more periodic reference signals, a repetition number of the one or more periodic reference signals, a repetition pattern of the one or more periodic reference signals, or a time gap between repetitions of the one or more periodic reference signals.

In an eighth additional aspect, alone or in combination with one or more of the first through seventh aspects, the power saving mode of the base station is based at least in part on one or more of a number of UEs connected with the base station, an amount of traffic handled by the base station, a type of traffic handled by the base station, channeling conditions for channels between the base station and the UE, or communication channels for UEs connected with the base station.

In a ninth additional aspect, alone or in combination with one or more of the first through eighth aspects, the configuration is associated with cancelation of a set of the one or more periodic reference signals, the cancelation being based at least in part on one or more ports associated with the one or more periodic reference signals.

In a tenth additional aspect, alone or in combination with one or more of the first through ninth aspects, the configuration is associated with a set of one or more candidate values of a timing offset between a symbol allocated for receiving the one or more periodic reference signals and a first uplink transmission symbol scheduled for transmitting a CSI-RS report associated with the one or more periodic reference signals.

In an eleventh additional aspect, alone or in combination with one or more of the first through tenth aspects, process 800 includes receiving a report associated with receiving the one or more periodic reference signals, wherein contents of the report are based at least in part on the power saving mode of the base station.

In a twelfth additional aspect, alone or in combination with one or more of the first through eleventh aspects, process 800 includes transmitting an indication of a report configuration that indicates candidate sets of report elements, the candidate sets of report elements selectable for inclusion in the report based at least in part on the power saving mode of the base station.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
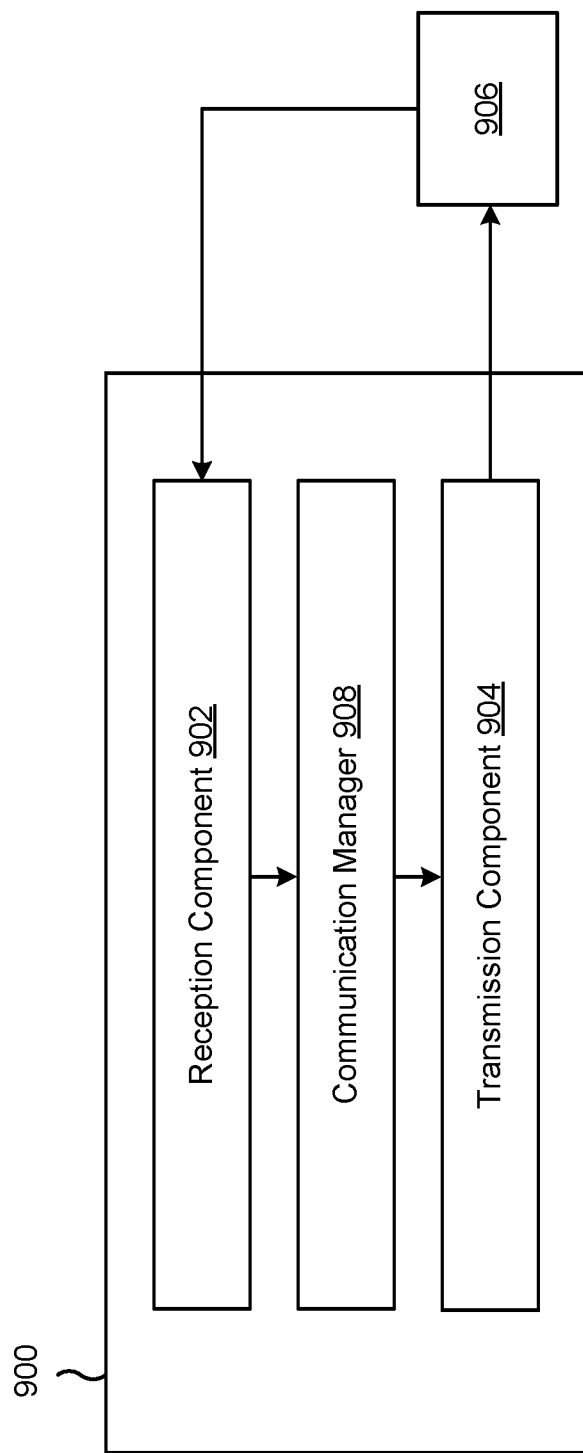
FIGS. 9 and 10 are diagrams of example apparatuses for wireless communication in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (for example, the communication manager 140). The communication manager 908 may provide information to, or receive information from, the reception component 902 and the transmission component 904 in connection with one or more of reception or transmission operations described herein.

In some aspects, the apparatus 900 may be configured to perform one or more operations described herein in connection with FIGS. 4-6. Additionally or alternatively, the apparatus 900 may be configured to perform one or more processes described herein, such as process 700 of FIG. 7. In some aspects, the apparatus 900 or one or more components shown in FIG. 9 may include one or more components of the UE described in connection with FIG. 2. Additionally or alternatively, one or more components shown in FIG. 9 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication of a power saving mode of a base station. The reception component 902 or transmission component 904 may communicate with the base station, the communicating comprising transmitting one or more periodic reference signals having a configuration that is based at least in part on the power saving mode of the base station, or receiving the one or more periodic reference signals having the configuration that is based at least in part on the power saving mode of the base station.

The reception component 902 may receive an indication of an additional power saving mode of the base station having an additional configuration associated with one or more of cancelation of one or more occasions of the one or more periodic reference signals that were not canceled in the power saving mode, or a sampling factor of the one or more periodic reference signals that is different from a sampling factor associated with the power saving mode.

The reception component 902 may receive an indication to associate, with the power saving mode of the base station, one or more of a periodicity of the one or more periodic reference signals, a repetition number of the one or more periodic reference signals, a repetition pattern of the one or more periodic reference signals, or a time gap between repetitions of the one or more periodic reference signals.

The transmission component 904 may transmit a report associated with receiving the one or more periodic reference signals, wherein report elements included in the report are based at least in part on the power saving mode of the base station.

The reception component 902 may receive an indication of a report configuration that indicates candidate sets of report elements, the candidate sets of report elements selectable for inclusion in the report based at least in part on the power saving mode of the base station.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
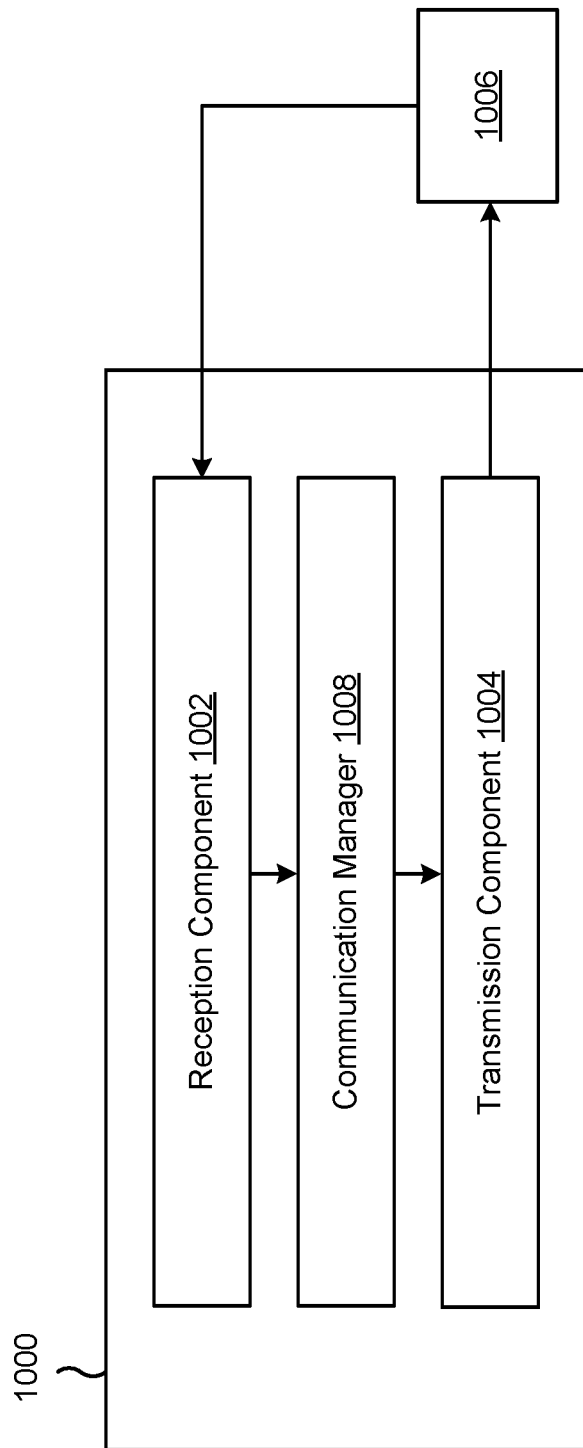

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (for example, the communication manager 140). The communication manager 1008 may provide information to, or receive information from, the reception component 1002 and the transmission component 1004 in connection with one or more of reception or transmission operations described herein.

In some aspects, the apparatus 1000 may be configured to perform one or more operations described herein in connection with FIGS. 4-6. Additionally or alternatively, the apparatus 1000 may be configured to perform one or more processes described herein, such as process 800 of FIG. 8. In some aspects, the apparatus 1000 or one or more components shown in FIG. 10 may include one or more components of the base station described in connection with FIG. 2. Additionally or alternatively, one or more components shown in FIG. 10 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit an indication of a power saving mode of the base station for communicating with a UE. The reception component 1002 or transmission component 1004 may communicate with the UE, the communicating comprising transmitting one or more periodic reference signals having a configuration that is based at least in part on the power saving mode of the base station, or receiving the one or more periodic reference signals having the configuration that is based at least in part on the power saving mode of the base station.

The transmission component 1004 may transmit an indication of an additional power saving mode of the base station having an additional configuration associated with one or more of cancelation of one or more occasions of the one or more periodic reference signals that were not canceled in the power saving mode, or a sampling factor of the one or more periodic reference signals that is different from a sampling factor associated with the power saving mode.

The transmission component 1004 may transmit an indication to associate, with the power saving mode of the base station, one or more of a periodicity of the one or more periodic reference signals, a repetition number of the one or more periodic reference signals, a repetition pattern of the one or more periodic reference signals, or a time gap between repetitions of the one or more periodic reference signals.

The reception component 1002 may receive a report associated with receiving the one or more periodic reference signals, wherein contents of the report are based at least in part on the power saving mode of the base station.

The transmission component 1004 may transmit an indication of a report configuration that indicates candidate sets of report elements, the candidate sets of report elements selectable for inclusion in the report based at least in part on the power saving mode of the base station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a power saving mode of a base station; and communicating with the base station, the communicating comprising: transmitting one or more periodic reference signals having a configuration that is based at least in part on the power saving mode of the base station, or receiving the one or more periodic reference signals having the configuration that is based at least in part on the power saving mode of the base station.

Aspect 2: The method of Aspect 1, wherein the one or more periodic reference signals comprise one or more of channel state information reference signals (CSI-RSs) or sounding reference signals (SRSs).

Aspect 3: The method of any of Aspects 1 or 2, wherein the configuration is associated with one or more of: a periodicity of the one or more periodic reference signals, a repetition number of the one or more periodic reference signals, a repetition pattern of the one or more periodic reference signals, or a time gap between repetitions of the one or more periodic reference signals.

Aspect 4: The method of any of Aspects 1-3, further comprising: receiving an indication of a second power saving mode of the base station having a second configuration associated with one or more of: cancelation of one or more occasions of the one or more periodic reference signals that were not canceled in the power saving mode, or a sampling factor of the one or more periodic reference signals that is different from a sampling factor associated with the power saving mode.

Aspect 5: The method of Aspect 4, wherein transmitting the one or more periodic reference signals or receiving the one or more periodic reference signals is based at least in part on one or more of: receiving an indication to change to the power saving mode of the base station from a previously active power saving mode of the base station, receiving an indication to activate the one or more periodic reference signals, or receiving an indication to change the sampling factor of the one or more periodic reference signals to a sampling factor that is different from a sampling factor associated with the power saving mode.

Aspect 6: The method of any of Aspects 1-5, wherein receiving the indication of the power saving mode of the base station comprises receiving one or both of: an explicit indication, or an indication of a change of the power saving mode of the base station relative to another power saving mode of the base station.

Aspect 7: The method of any of Aspects 1-6, wherein: the configuration is associated with a comb level of the one or more periodic reference signals that is based at least in part on the power saving mode of the base station, or the configuration is associated with a comb offset of the one or more periodic reference signals that is based at least in part on the power saving mode of the base station.

Aspect 8: The method of any of Aspects 1-7, further comprising: receiving an indication to associate, with the power saving mode of the base station, one or more of: a periodicity of the one or more periodic reference signals, a repetition number of the one or more periodic reference signals, a repetition pattern of the one or more periodic reference signals, or a time gap between repetitions of the one or more periodic reference signals.

Aspect 9: The method of any of Aspects 1-8, wherein the power saving mode of the base station is based at least in part on one or more of: a number of UEs connected with the base station, an amount of traffic handled by the base station, a type of traffic handled by the base station, channel conditions for channels between the base station and the UE, or communication channels for UEs connected with the base station.

Aspect 10: The method of any of Aspects 1-9, wherein the configuration is associated with cancelation of a set of the one or more periodic reference signals, the cancelation being based at least in part on one or more ports associated with the one or more periodic reference signals.

Aspect 11: The method of any of Aspects 1-10, wherein the configuration is associated with a set of one or more candidate values of a timing offset between a symbol allocated for receiving the one or more periodic reference signals and a first uplink transmission symbol scheduled for transmitting a channel state information reference signal (CSI-RS) report associated with the one or more periodic reference signals.

Aspect 12: The method of any of Aspects 1-11, further comprising: transmitting a report associated with receiving the one or more periodic reference signals, wherein report elements included in the report are based at least in part on the power saving mode of the base station.

Aspect 13: The method of Aspect 12, further comprising: receiving an indication of a report configuration that indicates candidate sets of report elements, the candidate sets of report elements selectable for inclusion in the report based at least in part on the power saving mode of the base station.

Aspect 14: A method of wireless communication performed by a base station, comprising: transmitting an indication of a power saving mode of the base station for communicating with a user equipment (UE); and communicating with the UE, the communicating comprising: transmitting one or more periodic reference signals having a configuration that is based at least in part on the power saving mode of the base station, or receiving the one or more periodic reference signals having the configuration that is based at least in part on the power saving mode of the base station.

Aspect 15: The method of Aspect 14, wherein the one or more periodic reference signals comprise one or more of channel state information reference signals (CSI-RSs) or sounding reference signals (SRSs).

Aspect 16: The method of any of Aspects 14 or 15, wherein the configuration is associated with one or more of: a periodicity of the one or more periodic reference signals, a repetition number of the one or more periodic reference signals, a repetition pattern of the one or more periodic reference signals, or a time gap between resources for repetitions of the one or more periodic reference signals.

Aspect 17: The method of any of Aspects 14-16, further comprising: transmitting an indication of a second power saving mode of the base station having a second configuration associated with one or more of: cancelation of one or more occasions of the one or more periodic reference signals that were not canceled in the power saving mode, or a sampling factor of the one or more periodic reference signals that is different from a sampling factor associated with the power saving mode.

Aspect 18: The method of Aspect 17, wherein transmitting the one or more periodic reference signals or receiving the one or more periodic reference signals is based at least in part on one or more of: transmitting an indication to change to the power saving mode of the base station from a previously active power saving mode of the base station, transmitting an indication to activate the one or more periodic reference signals, or transmitting an indication to change the sampling factor of the one or more periodic reference signals to a sampling factor that is different from a sampling factor associated with the power saving mode.

Aspect 19: The method of any of Aspects 14-18, wherein transmitting the indication of the power saving mode of the base station comprises transmitting one or both of: an explicit indication, or an indication of a change of the power saving mode of the base station relative to another power saving mode of the base station.

Aspect 20: The method of any of Aspects 14-19, wherein: the configuration is associated with a comb level of the one or more periodic reference signals that is based at least in part on the power saving mode of the base station, or the configuration is associated with a comb offset of the one or more periodic reference signals that is based at least in part on the power saving mode of the base station.

Aspect 21: The method of any of Aspects 14-20, further comprising: transmitting an indication to associate, with the power saving mode of the base station, one or more of: a periodicity of the one or more periodic reference signals, a repetition number of the one or more periodic reference signals, a repetition pattern of the one or more periodic reference signals, or a time gap between repetitions of the one or more periodic reference signals.

Aspect 22: The method of any of Aspects 14-21, wherein the power saving mode of the base station is based at least in part on one or more of: a number of UEs connected with the base station, an amount of traffic handled by the base station, a type of traffic handled by the base station, channel conditions for channels between the base station and the UE, or communication channels for UEs connected with the base station.

Aspect 23: The method of any of Aspects 14-22, wherein the configuration is associated with cancelation of a set of the one or more periodic reference signals, the cancelation being based at least in part on one or more ports associated with the one or more periodic reference signals.

Aspect 24: The method of any of Aspects 14-23, wherein the configuration is associated with a set of one or more candidate values of a timing offset between a symbol allocated for receiving the one or more periodic reference signals and a first uplink transmission symbol scheduled for transmitting a channel state information reference signal (CSI-RS) report associated with the one or more periodic reference signals.

Aspect 25: The method of any of Aspects 14-24, further comprising: receiving a report associated with receiving the one or more periodic reference signals, wherein contents of the report are based at least in part on the power saving mode of the base station.

Aspect 26: The method of Aspect 25, further comprising: transmitting an indication of a report configuration that indicates candidate sets of report elements, the candidate sets of report elements selectable for inclusion in the report based at least in part on the power saving mode of the base station.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   a processing system that includes one or more processors; and
   one or more memories communicatively coupled with the one or more processors, the processing system configured to cause the UE to:
   receive an indication of a first power saving mode of a network entity;
   communicate with the network entity, the communication comprising:
   a transmission of one or more periodic reference signals having a first configuration associated with the first power saving mode of the network entity, the first configuration being associated with a time gap between repetitions of the one or more periodic reference signals, or
   a reception of the one or more periodic reference signals having the first configuration; and
   receive an indication of a second power saving mode of the network entity having a second configuration associated with one or more of:
   cancelation of one or more occasions of the one or more periodic reference signals that were not canceled in the first power saving mode of the network entity, or
   a sampling factor of the one or more periodic reference signals that is different from a sampling factor associated with the first power saving mode of the network entity.

2. The UE of claim 1, wherein the one or more periodic reference signals comprise one or more of channel state information reference signals (CSI-RSs) or sounding reference signals (SRSs).

3. The UE of claim 1, wherein the configuration is further associated with one or more of:
- a periodicity of the one or more periodic reference signals,
- a repetition number of the one or more periodic reference signals, or
- a repetition pattern of the one or more periodic reference signals.

4. The UE of claim 1, wherein the indication of the first power saving mode of the network entity comprises one or more of:
- an indication to change to the first power saving mode of the network entity from a previously active power saving mode of the network entity,
- an indication to activate the one or more periodic reference signals, or
- an indication to change the sampling factor of the one or more periodic reference signals to another sampling factor that is different from the sampling factor associated with the first power saving mode of the network entity.

5. The UE of claim 1, wherein the processing system, to cause the UE to receive the indication of the first power saving mode of the network entity, is configured to cause the UE to receive one or both of:
- an explicit indication, or
- an indication of a change of the first power saving mode of the network entity relative to another power saving mode of the network entity.

6. The UE of claim 1, wherein:
- the first configuration is associated with a comb level of the one or more periodic reference signals that is based at least in part on the first power saving mode of the network entity, or
- the first configuration is associated with a comb offset of the one or more periodic reference signals that is based at least in part on the first power saving mode of the network entity.

7. The UE of claim 1, wherein the processing system is further configured to cause the UE to:
receive an indication to associate, with the first power saving mode of the network entity, one or more of:
- a periodicity of the one or more periodic reference signals,
- a repetition number of the one or more periodic reference signals,
- a repetition pattern of the one or more periodic reference signals, or
- the time gap.

8. The UE of claim 1, wherein the first configuration is associated with cancelation of a set of the one or more periodic reference signals, the cancelation of the set being based at least in part on one or more ports associated with the one or more periodic reference signals.

9. The UE of claim 1, wherein the first configuration is associated with a set of one or more candidate values of a timing offset between a symbol allocated for receiving the one or more periodic reference signals and a first uplink transmission symbol scheduled for transmitting a channel state information reference signal (CSI-RS) report associated with the one or more periodic reference signals.

10. The UE of claim 1, wherein the processing system is further configured to cause the UE to:
transmit a report associated with the reception of the one or more periodic reference signals, wherein report elements included in the report are based at least in part on the first power saving mode of the network entity.

11. The UE of claim 10, wherein the processing system is further configured to cause the UE to:
receive an indication of a report configuration that indicates candidate sets of report elements, the candidate sets of report elements being selectable for inclusion in the report based at least in part on the first power saving mode of the network entity.

12. A network entity for wireless communication, comprising:
a processing system that includes one or more processors; and
one or more memories communicatively coupled with the one or more processors, the processing system configured to cause the network entity to:
transmit an indication of a first power saving mode of the network entity for communicating with a user equipment (UE);
communicate with the UE, the communication comprising:
- a transmission of one or more periodic reference signals having a first configuration associated with the first power saving mode of the network entity, the first configuration being associated with a time gap between repetitions of the one or more periodic reference signals, or
- a reception of the one or more periodic reference signals having the first configuration; and
transmit an indication of a second power saving mode of the network entity having a second configuration associated with one or more of:
- cancelation of one or more occasions of the one or more periodic reference signals that were not canceled in the first power saving mode of the network entity, or
- a sampling factor of the one or more periodic reference signals that is different from a sampling factor associated with the first power saving mode of the network entity.

13. The network entity of claim 12, wherein the one or more periodic reference signals comprise one or more of channel state information reference signals (CSI-RSs) or sounding reference signals (SRSs).

14. The network entity of claim 12, wherein the first configuration is further associated with one or more of:
- a periodicity of the one or more periodic reference signals,
- a repetition number of the one or more periodic reference signals, or
- a repetition pattern of the one or more periodic reference signals.

15. The network entity of claim 12, wherein the indication of the first power saving mode of the network entity comprises one or more of:
- an indication to change to the first power saving mode of the network entity from a previously active power saving mode of the network entity,
- an indication to activate the one or more periodic reference signals, or
- an indication to change the sampling factor of the one or more periodic reference signals to another sampling factor that is different from a factor associated with the first power saving mode of the network entity.

16. The network entity of claim 12, wherein the processing system, to cause the network entity to transmit the indication of the first power saving mode of the network entity, is configured to cause the network entity to:
an explicit indication, or
an indication of a change of the first power saving mode of the network entity relative to another power saving mode of the network entity.

17. The network entity of claim 12, wherein:
the first configuration is associated with a comb level of the one or more periodic reference signals that is based at least in part on the first power saving mode of the network entity, or
the first configuration is associated with a comb offset of the one or more periodic reference signals that is based at least in part on the first power saving mode of the network entity.

18. The network entity of claim 12, wherein the processing system is further configured to cause the network entity to:
transmit an indication to associate, with the first power saving mode of the network entity, one or more of:
a periodicity of the one or more periodic reference signals,
a repetition number of the one or more periodic reference signals,
a repetition pattern of the one or more periodic reference signals, or
the time gap.

19. The network entity of claim 12, wherein the first power saving mode of the network entity is based at least in part on one or more of:
a number of UEs connected with the network entity,
an amount of traffic handled by the network entity,
a type of traffic handled by the network entity,
channel conditions for channels between the network entity and the UE, or
communication channels for the UEs connected with the network entity.

20. The network entity of claim 12, wherein the first configuration is associated with cancelation of a set of the one or more periodic reference signals, the cancelation of the set being based at least in part on one or more ports associated with the one or more periodic reference signals.

21. The network entity of claim 12, wherein the first configuration is associated with a set of one or more candidate values of a timing offset between a symbol allocated for receiving the one or more periodic reference signals and a first uplink transmission symbol scheduled for transmitting a channel state information reference signal (CSI-RS) report associated with the one or more periodic reference signals.

22. The network entity of claim 12, wherein the processing system is further configured to cause the network entity to:
receive a report associated with the transmission of the one or more periodic reference signals, wherein contents of the report are based at least in part on the first power saving mode of the network entity.

23. The network entity of claim 22, wherein the processing system is further configured to cause the network entity to:
transmit an indication of a report configuration that indicates candidate sets of report elements, the candidate sets of report elements being selectable for inclusion in the report based at least in part on the first power saving mode of the network entity.

24. A method of wireless communication performed by a user equipment (UE), comprising:

receiving an indication of a first power saving mode of a network entity;
communicating with the network entity by:
transmitting one or more periodic reference signals having a first configuration that is associated with the first power saving mode of the network entity, the first configuration being associated with a time gap between repetitions of the one or more periodic reference signals, or
receiving the one or more periodic reference signals having the first configuration; and
receiving an indication of a second power saving mode of the network entity having a second configuration associated with one or more of:
cancelation of one or more occasions of the one or more periodic reference signals that were not canceled in the first power saving mode of the network entity, or
a sampling factor of the one or more periodic reference signals that is different from a sampling factor associated with the first power saving mode of the network entity.

25. The method of claim 24, wherein the first configuration is further associated with one or more of:
a periodicity of the one or more periodic reference signals,
a repetition number of the one or more periodic reference signals, or
a repetition pattern of the one or more periodic reference signals.

26. The method of claim 24, further comprising:
receiving an indication to associate, with the first power saving mode of the network entity, one or more of:
a periodicity of the one or more periodic reference signals,
a repetition number of the one or more periodic reference signals,
a repetition pattern of the one or more periodic reference signals, or
the time gap.

27. The method of claim 24, wherein the first configuration is associated with cancelation of a set of the one or more periodic reference signals, the cancelation of the set being based at least in part on one or more ports associated with the one or more periodic reference signals.

28. A method of wireless communication performed by a network entity, comprising:
transmitting an indication of a first power saving mode of the network entity for communicating with a user equipment (UE);
communicating with the UE by:
transmitting one or more periodic reference signals having a first configuration that is associated with the first power saving mode of the network entity, the first configuration being associated with a time gap between repetitions of the one or more periodic reference signals, or
receiving the one or more periodic reference signals having the first configuration; and
transmitting an indication of a second power saving mode of the network entity having a second configuration associated with one or more of:
cancelation of one or more occasions of the one or more periodic reference signals that were not canceled in the first power saving mode of the network entity, or
a sampling factor of the one or more periodic reference signals that is different from a sampling factor associated with the first power saving mode of the network entity.

29. The method of claim 28, wherein the first configuration is associated with one or more of:
- a periodicity of the one or more periodic reference signals,
- a repetition number of the one or more periodic reference signals, or
- a repetition pattern of the one or more periodic reference signals.

30. The method of claim 28, wherein the first configuration is associated with cancelation of a set of the one or more periodic reference signals, the cancelation of the set being based at least in part on one or more ports associated with the one or more periodic reference.

* * * * *